(12) United States Patent  
Andersen

(10) Patent No.: US 7,495,200 B1  
(45) Date of Patent: Feb. 24, 2009

(54) HOLOGRAPHIC ADAPTIVE OPTIC SYSTEM

(75) Inventor: Geoff P. Andersen, Colorado Springs, CO (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 59 days.

(21) Appl. No.: 11/772,510

(22) Filed: Jul. 2, 2007

(51) Int. Cl.
*G01B 9/02* (2006.01)

(52) U.S. Cl. .................... 250/201.9; 356/512; 356/521; 359/16

(58) Field of Classification Search .............. 250/201.9, 250/201.1, 216; 356/512–515, 521, 124.5; 359/15, 16, 19, 569
See application file for complete search history.

(56) References Cited

U.S. PATENT DOCUMENTS 5,410,397 A * 4/1995 Toeppen ..................... 356/121

7,268,937 B1 * 9/2007 Andersen et al. ............ 359/359

* cited by examiner

*Primary Examiner*—Kevin Pyo  
(74) *Attorney, Agent, or Firm*—AFMCLO/JAZ; Jeffrey R. Moore

(57) ABSTRACT

A holographic adaptive optic system for correcting the wavefront of a light. A phase correction device with a plurality of pixels in the path of the light. A holographic wavefront sensor in the path providing a pair of reconstruction beams for each phase correction device pixel. The relative intensity of the two beams being proportional to the amount of aberration present in the initial beam. A detector that measures the relative intensity of the pair of reconstructed beams. The detector connected by at least one individual control connector to the relevant pixel in the phase correction device. The individual control connectors controlling the phase correction device based upon the relative intensity between the two reconstruction beams to reduce the wavefront aberration.

11 Claims, 2 Drawing Sheets

HOLOGRAPHIC ADAPTIVE OPTIC SYSTEM

The invention described herein may be manufactured and used by or for the Government of the United States for all governmental purposes without the payment of any royalty.

BACKGROUND OF THE INVENTION

The invention relates to an adaptive optics system incorporating a holographic wavefront sensor.

A highly spherical (or flat) wavefront is required for diffraction-limited imaging, and peak-to-valley phase errors of less than a quarter of a wavelength are generally preferred. In many cases, however, imaging is degraded due to distortions of the phase of the final wavefront. For example, when viewing scenes through the atmosphere, variations in refractive index due to pockets of hot and cold air can distort a wavefront significantly, blurring images and limiting the resolution. Imperfect or misaligned optics can also result in phase distortions which will similarly degrade image quality.

Adaptive optics is a technique which can correct for these aberrations. The process involves detecting the shape of the distorted wavefront and then applying the inverse error to return the wavefront to the desired flatness. The wavefront is typically characterized using a wavefront sensor of which there are several types. Once the phase is known, a computer calculates the correction to be applied to correct the wavefront. This correction is then applied to the incoming wavefront using one of several types of adaptive optics. Generally this process is slowed due to computational loads imposed by the detection and computational methods as well as requirements of control software to take the "sensed" data and convert this into "correction" signals for the corrective optic. For this reason there are limits on the speeds that adaptive correction can achieve in real life systems. Typical adaptive optics systems operate at around 100 Hz, with the fastest ones approaching 10 kHz. In cases of extremely rapid phase changes such as those experienced in looking through airflows around airplanes, conventional adaptive optics may not be fast enough to provide acceptable correction.

In patent application Ser. No. 11/138,727 titled "Holographic Wavefront Sensor" and incorporated herein by reference we introduced a fast holographic wavefront sensor capable of characterizing wavefronts at speeds greater than 100 kHz—some 10 times faster than those currently in use. This wavefront data must then be utilized in such a way that a correction can be applied to the wavefront with little or no time delay. Even if this wavefront sensor were inserted into a conventional adaptive optics system, the data transfer and control software bottlenecks would slow down the correction process considerably. In this patent we describe a method for tailoring the sensing parameters of the holographic wavefront sensor to our adaptive optic. In essence there will be a one-to-one relationship between a particular phase component in the wavefront and an actuator such that the detection can be used to control the actuator without any intermediate computations or control software.

SUMMARY OF THE INVENTION

A holographic adaptive optics system for correcting the wavefront of a light including a light wavefront having a phase and a path. A phase correction device with a plurality of pixels in the path. A holographic wavefront sensor in the path providing. The holographic wavefront sensor providing two reconstruction beams for each phase correction device pixel. Each beam with an intensity and illuminating a detector at two different detector locations. The beams having a relative intensity between the two reconstruction beams. The detector connected by at least one individual control connector to the phase correction device. The individual control connectors controlling the phase correction device based upon the relative intensity between the two reconstruction beams.

DETAILED DESCRIPTION

Figure 1:
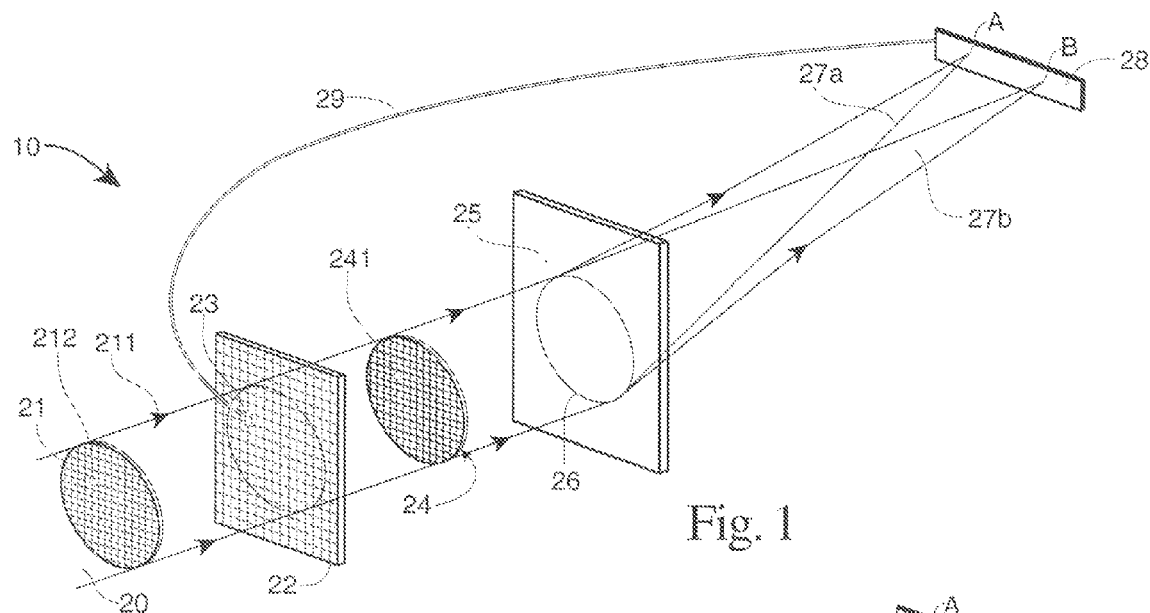
FIG. 1 is an illustrative view of how a holographic wavefront sensor would operate in detecting a maximum or minimum phase delay in a portion of an otherwise plane wavefront (represented by $A^\circ_{max} Z^\circ$) for correcting a phase of a light wavefront.

The holographic adaptive optics system consists of three major parts, a holographic wavefront sensor, a detector to register the locations of reconstructed beams, and a device for producing phase corrections to a wavefront.

The first part of the adaptive optics system involves a holographic wavefront sensor (HWFS) described in patent application Ser. No. 11/138,727 titled "Holographic Wavefront Sensor" and incorporated herein by reference. This wavefront sensor analyzes an entire wavefront at once (a so-called modal detector) using a hologram. The wavefront sensor may consist of a diffractive optical element such as a multiplexed hologram which may be fabricated or programmed in advance with all aberrations to be corrected. In operation, a wavefront incident on the hologram is divided up into multiple output beams according to the presence and strength of particular aberrations present in the input.

The HWFS may operate at any wavelength in the electromagnetic spectrum. Any type of hologram including phase, intensity, relief, spatial-spectral, reflection, transmission, dynamically varying, static recordings or combinations thereof may be used. Any holographic media including liquid crystal displays, photorefractive crystals, glasses and polymers, liquids, gasses, metal substrates, photographic film, gelatins or combinations thereof may be used. The holograms may be manufactured by any means known in the art including mechanical, optical, and/or computer generated fabrication. In patent application Ser. No. 11/138,727 we described how the HWFS might work to characterize a wavefront in terms of Zernike polynomials. In the present invention the concept of using a basis set derived from the adaptive optic may be used in the correction process.

An input beam carries the wavefront to the HWFS. The input beam may have any cross-section, fill-factor (obscuration), polarization or intensity profile. Variations in these properties will not affect the operation, but in certain cases the fabrication of the hologram may have to be modified in order to accommodate the input beam properties. For example, if the input beam has a particular obscuration, the hologram may have to be written in such a way as to anticipate this beam profile.

Many different types of phase correction devices exist to produce phase corrections to a wavefront. These include deformable mirrors (DMs) such as direct phase delay by reflection off a deformable membrane mirror, micro-electromechanical mirrors (MEMS), liquid crystal displays (LCDs), or combinations thereof. In these devices the application of a change in phase at a particular point on a wavefront may be largely or completely independent and uncorrelated with any other point on the wavefront. For example, if we consider a liquid crystal display, the phase correction may be applied by changing the relative phase delay for individual pixels over the entire extent of the beam. Preferably, the phase delay applied to one pixel will not affect the phase delay applied at any other pixel. Thus the pixels (control elements) can be said to form an orthogonal basis set. As a general terminology, the phase correction device (PCD) is designed herein to consist of multiple independent control elements, each a phase delay pixel.

Correction of wavefront phase errors can be applied by many different methods and devices. These include devices such as liquid crystal phase modulators, deformable mirrors, micro-electromechanical mirror (MEMS) devices, microfluid actuated facesheets and any other means of correction known in the art. Although the description of operation of this invention has concentrated on "pixilated devices", any type of continuous (i.e. non-discrete) device may also be applicable.

The basic operation of a holographic adaptive optics system 10 is shown in FIG. 1. FIG. 1 includes an input beam 20 having a wavefront 21. The wavefront 21 having a phase (not shown), a aberration 212, and a path 211. FIG. 1 further includes a phase correction device 22 with a plurality of individual pixel(s) 23, an output wavefront 24 with a wavefront delay 241, a design hologram 25 with a wavefront impact region 26, reconstructed beams 27a and 27b creating a first reconstruction spot A and a second reconstruction spot B respectively; a detector 28 and an individual control connector 29.

In FIG. 1 the phase correction device 22 may comprise a transmissive liquid crystal display which may delay the phase of the wavefront 21 passing through it at various pixel locations. In FIG. 1, the location of the wavefront aberration 212 is altered by pixel element 23 to give the resulting wavefront delay 241. The delay is designed to reduce the wavefront aberration and provide a corrected wavefront 24. A phase delay from the $i^{th}$ pixel element on the transmitted output wavefront 24 may be described by a phase function $Z^i$ which is independent (orthogonal) to each of the other pixels in the phase correction device 22. The maximum and minimum phase delay that can be given to any wavefront by the liquid crystal display (phase correction device 22) at a given pixel may be $A^i_{max}$ and $A^i_{max}$ respectively. The typical value that is applied ($A^i$) is generally somewhere between these two extremes. Any arbitrary wavefront $W(\rho,\theta)$ generated by the phase correction device may be described as a sum of the phases applied by each of n control elements:

$$W(\rho, \theta) = \sum_{i=1}^{n} A^i Z^i \text{ where } A^i_{min} \leq A^i \leq A^i_{max} \quad (1)$$

This sort of phase correction device may be used to correct phase errors in an arbitrary wavefront. Preferably, the required phase delays are applied at each pixel location (typically a plurality of pixel locations but represented as the individual pixel 23 in FIG. 1) needing adjusting while the beam passes through the phase correction device. Physically these pixel sizes relate to about 5 microns (µm) to about 10 mm. The holographic wavefront sensor may be multiplexed with a maximum and minimum phase response function.

The state of the wavefront phase is preferably sensed for each pixel location, and then the phase correction device gives the required phase delay. However, conventional wavefront sensing techniques are quite slow and require complex calculations in order to determine each phase delay $A^i$ and once calculated by a computer this information must be converted into some method for controlling the phase correction device to apply the correction.

In the present invention the holographic wavefront sensor is designed with the capability to sense $A^i$ directly, and use the output of the sensor to control the adaptive optic directly with no computations of a computer required. To do so, the holographic wavefront sensor is programmed with the orthogonal set of functions $Z^{1-n}$.

In the case of just one control element (pixel) and its corresponding phase function $Z^o$, with limiting extremes of phase delay given by $A^o_{max}$ and $A^o_{min}$ respectively, the sensing portion of the adaptive optics system requires a holographic wavefront sensor (multiplexed hologram). As described in patent application Ser. No. 11/138,727 titled "Holographic Wavefront Sensor" and incorporated herein by reference, this can be achieved a variety of ways. However it is achieved, if a specific object wavefront is incident on the hologram, a diffracted focused beam will be created to produce a focused spot on a distant detector. In this case, the specific input wavefronts are defined by the maximum and minimum phase delays that can be introduced by a given pixel (control element) on the phase correction device. In the present invention the holographic wavefront sensor includes a combination of at least the design hologram 25, the reconstructed beams 27a and 27b, and the detector 28.

In FIG. 1, if the wavefront 21 was planar and incident to the phase correction device 22, the minimum phase delay present on a particular pixel 23 is designed to produce a plane wave (output wavefront 24) with a localized phase delay 241 at the position corresponding to the pixel 23. When the plane wave (output wavefront 24) pixel 23 location 24 localized phase delay 241 strikes the design hologram 25, it will reconstruct the focused beam 27a to produce a focus point A on the detector 28. The individual control connector 29 provides a conduit for the response function to control the phase correction device 22.

If the same pixel were set to the maximum phase delay, the situation would look very similar but create a second reconstructed beam 27b with a second focus at position B on the distant detector 28. In this case, the wavefront with the maximum phase delay at the pixel location 24 would reconstruct the second reconstructed beam 27b. This second reconstructed beam 27b will focus at a position B on the distant detector 28. The brightness of point A and B will depend on the amount of correction and specific phase delay.

The holographic wavefront sensor of FIG. 1 detects the amplitude of a single aberration component $Z^o$ between amplitude extremes of $A^o_{max}$ and $A^o_{min}$. If the actual value of amplitude is something in between these two extremes, there will appear two spots on the detector 28 at points A and B. Points A and B may represent are two spatially separate diffracted beams indicating the weighting of the aberration between two aberration or actuator extremes.

Any single beam directed onto the hologram will "see" two holograms simultaneously and thus two spots will be reconstructed at points A and B. However, the phase matching condition of the reconstruction is such that if the illuminating wavefront is $A^o_{min} Z^o$ then point A will be significantly brighter than point B. Likewise if the illuminating wavefront is $A^o_{max} Z^o$ then a bright point will appear at B and a dimmer spot at point A. For an incident wavefront function $Z^o$, having an amplitude between these two extremes, $A^o$ say, the relative brightness of the points A and B will determine the actual value.

For example, if $A^o_{min}=-2\lambda$ and $A^o_{max}=+2\lambda$ an equal brightness to the reconstructed spots will indicate that $A^o=0$. The relationship between relative spot brightness and amplitude may be non-linear, but the true relationship can always be found during a calibration procedure which involves creating various amplitudes and measuring the relative spot intensities. Typically the relative intensity of the two beams is proportional to the amount of aberration present in the initial (source) beam. Often this relationship may be directly proportional.

In order to sense the true value of the amplitude we need to know the energy density of the focused spot at the detector. Therefore, preferably the detector is a device capable of measuring the relative power or intensity ratios of the reconstructed spot A and B. For example, one possibility might be to use position sensing devices (PSD). These sense the centroidal position of photon flux across their surface. In the case of this adaptive optics system they would be used to sense a first-moment brightness between the two spots. With the PSD used in conjunction with the holographic wavefront sensor, the output voltage is directly related to the phase amplitude $A^o$ for the recorded aberration function $Z^o$. Since the output is a voltage, this can be used to directly control the phase correction device. Suitable PSDs may be obtained from Hamamatsu or SiTek.

The holographic wavefront sensor may use one or more detectors. Any detector known in the art may be used. Examples of suitable detectors include a position sensing device, a charge-coupled device, complementary metal-oxide-silicon detectors, diodes, photomultipliers or combinations thereof. Preferably, variations in aberration strength may be measured and an output provided directly via the individual control connector in the form of a variation in voltage or current to the phase correction device.

In this invention of a holographic adaptive optics scheme, the signal from the detector 28 is used to directly control the pixel element 23 in the phase correction device 22 corresponding to the specific location of the localized phase aberration in the initial wavefront 21 ($A^oZ^o$). The detector output through the control connector and the phase correction device may be matched to have similar responses. The responses may be based upon voltage, current and/or circuitry to have similar linear relationships and/or amplitudes. However, some intermediate signal modification on the individual control connector 29 may be required to ensure that the correct phase delay is applied for a given output from the detector 28. Such signal modifications by the individual control connector 29 may be any connector known in the art. The connector may be a wire, circuitry and wire, fiber optics, a mechanical, electro-mechanical or any combination thereof. The control connector 29 is preferably included in a hard-wired circuitry, so there will be negligible time delay and no computer computation time is required.

In practice, a large number of control connector 29 response functions would likely be required. Preferably, control connector response functions are encoded in the wavefront sensor. Thus the number of holograms to be multiplexed in the holographic medium (design hologram) may be twice the number of control connectors (giving two spots for each aberration function). Likewise there would have to be a separate detector for each pair of reconstruction spots (focus points) (A, B), or one detector for each control connector. Each of these detectors will control a particular element in the phase correction device directly.

Figure 2:
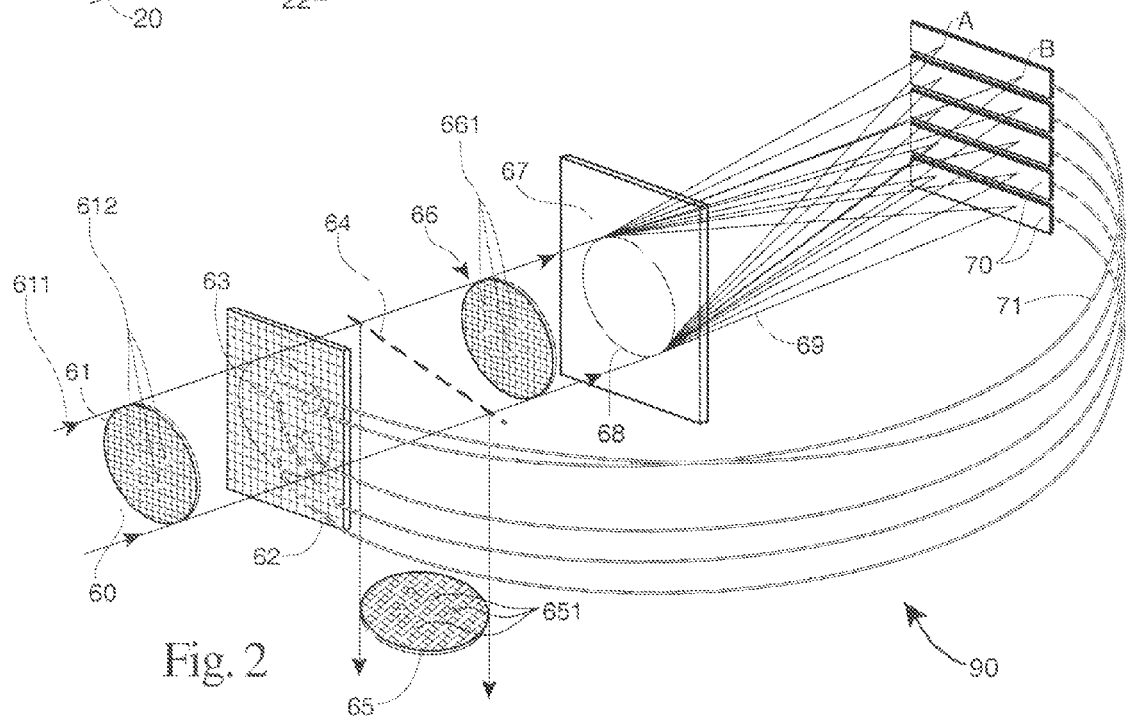
FIG. 2 is an illustrative view of one embodiment of the holographic adaptive optics correction system for correcting at least one phase of a light wavefront.

A possible representation of holographic adaptive optics correction system 90 is shown in FIG. 2. FIG. 2 includes an input beam 60 having a wavefront 61. The wavefront 61 having a phase with a phase aberration (not shown), waveform aberrations (612) and a path 611. FIG. 2 further includes a phase correction device 62 with a plurality of individual pixel(s) 63, an output wavefront 66 with a plurality of wavefront delays 661 which represent a correction or smoothing of the waveform discontinuities 612, a design hologram 67 with a wavefront impact region 68, a plurality of reconstructed beams 69 impacting a plurality of detectors 70 to generate a plurality of first reconstruction spots A and second reconstruction spots B; and a plurality of individual control connectors 71 providing controlling feedback to the phase correction device 62 at specific individual pixels 63. Each reconstructed beam 69 impacts a specific detector 70 to generate the first reconstruction spots A and second reconstruction spot B on the detector 70. Each detector 70 is designed to detect specific wavefront aberrations 612 relative to a specific corresponding pixel 63. FIG. 2 further shows a beam splitter 64 which splits off a corrected beam 65 with wavefront delays 651 that correspond to the wavefront delays 661.

Figure 3:
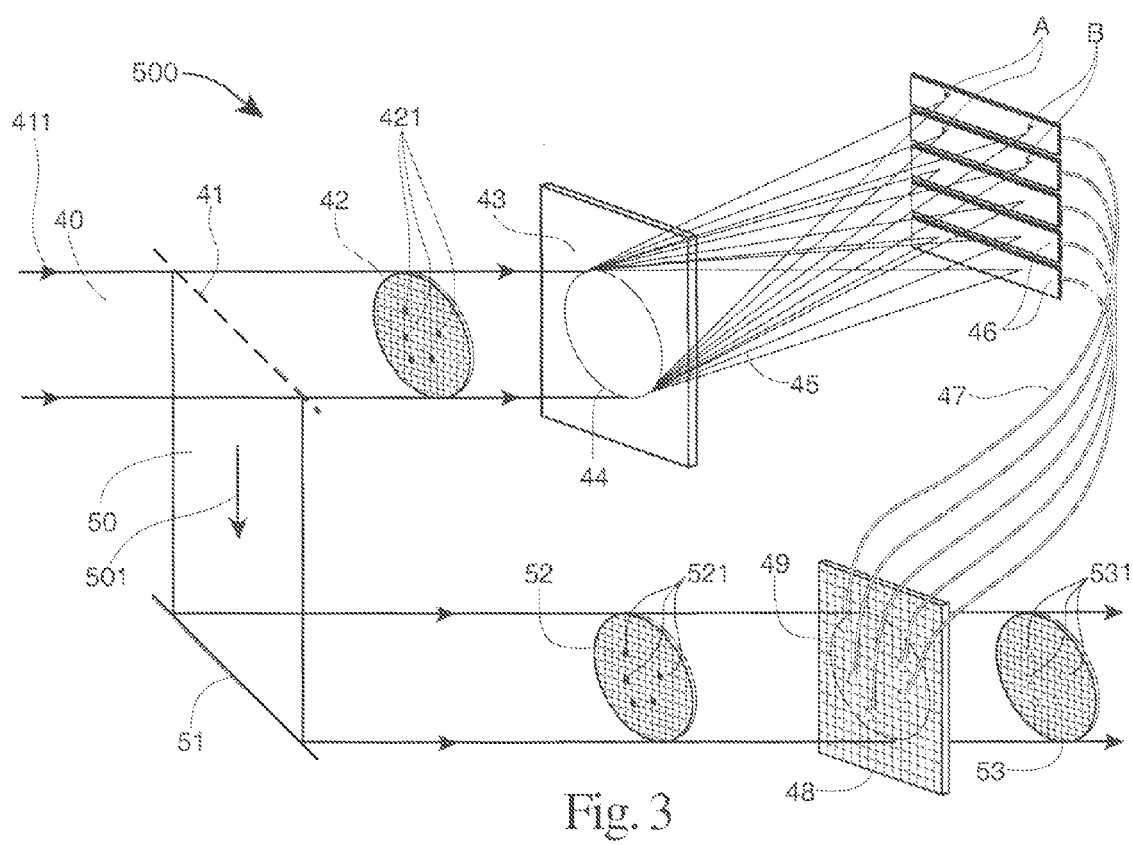
FIG. 3 is an illustrative view of an alternate mode of operation for the holographic adaptive optics correction system for correcting at least one phase of a light wavefront.

An alternate holographic adaptive optics correction system 500 is illustrated in FIG. 3. The holographic adaptive optics correction system 500 includes an input beam 40, a wavefront 42 having a phase (not shown), waveform aberrations (412) and a path 411, a multiplexed hologram 43 with a beam impact location 44, reconstruction beams 45, detectors 46, first focus points A, second focus points B, individual control connectors 47. FIG. 3 further shows a beam-splitter 41 creating a second beam 50 with a second path, a mirror 51, an uncorrected second beam wavefront 52 with waveform discontinuities 521, a phase correction device 48, with control elements/pixels 49, and a corrected beam wavefront 53 with a plurality of wavefront delays 531. These wavefront delays are designed to correct waveform discontinuities 521. The waveform discontinuities may be imperfections in the waveform caused by any number of factors that have been anticipated and incorporated into the phase correction device 48 to improve the wave quality of the corrected beam 53.

In FIG. 3, a portion of the input beam 40 is split off to the phase correction device 48, while a portion continues to the multiplexed hologram 43. Once the wavefront discontinuities 421 are converted by the multiplexed hologram 43 to reconstruction beams 45 and sensed by detectors 46, the phase correction device 48 is adjusted at pixels 49 as needed and a correction is applied to the second beam wavefront 52 by the phase correction device 48. The other portion of the incident beam 52 (split off by the beam-splitter 41) is directed through the phase correction device 48 by the mirror 51, resulting in corrected beam 53. The corrections may be provided over multiple iterations. It may also be possible to apply the correction first as a multiple or continuous iteration where the correction (or no correction) is initially applied to the output beam.

As shown in FIG. 2, the output beam 65 from the phase correction device 62 is the same as the beam being analyzed by the holographic wavefront sensor. The result is that generally the holographic wavefront sensor will be "seeing" small variations in wavefront error about a near-zero value since the phase correction device will have already provided some correction. This compares to the case in FIG. 3 where the beam being analyzed by the holographic wavefront sensor will always have the full input aberration present. The adaptive optics correction systems disclosed herein may be connected in series to further correct and improve the wavefront.

Reasons for using the arrangement of FIG. 2 vs. FIG. 3 may depend on the design of the holographic wavefront sensor. If the holographic wavefront sensor is designed to be sensitive to small phase variations in a near-diffraction-limited beam, then the embodiment disclosed in FIG. 3 may be preferred. Alternatively, if the holographic wavefront sensor is optimized for detecting small changes in heavily aberrated wavefronts then the embodiment shown in FIG. 2 might be optimal. Alternatively a combination of the embodiment shown in FIG. 2 and FIG. 3 may be selected.

FIGS. 2 and 3 show the operation of the holographic wavefront sensor with multiple pixels and detectors. While it may be preferable to have one detector controlling each pixel in our phase correction device, there is no limit as to how many pixels (control elements) can be included. The multiplexed hologram may be designed to detect phase variations on the input wavefront at any resolution corresponding to the number of pixels or control elements available or the desired order of wavefront correction. The shape of the input wavefront is also not important and the scheme could be easily adapted to any input cross-section, including those with obscurations.

For simplicity the aberrated wavefront and phase correction devices are illustrated as pixilated (or discrete) in spatial representation. However, this is not a requirement for successful operation of this system. For example, a more traditional wavefront correction method uses a deformable mirror consisting of a single continuous reflective face-sheet bonded to a number of actuators on the rear. By applying voltages to these actuators they can change in length and/or width and thus make it possible to modify the surface. Wavefront correction is achieved by reflecting an input beam off such a mirror. In this embodiment the motion of a single actuator will deform the mirror over an area around this actuator rather than in a truly isolated spot. This deformation may even overlap a region of the mirror controlled by another actuator. Cross-correlation in the actuator response may operate differently from the discrete pixilated operation, but such a phase correction device may also work in this invention. It works in part because the cross-correlation terms may be included in the design of the holographic wavefront sensor. There is no requirement that the phase correction of the present invention be applied in a strictly discrete manner. Preferably, the individual aberration phase functions ($Z^i$) are individually recorded in (or programmed into) the multiplexed hologram. Preferably the multiplexed hologram has a recording of the maximum and minimum phase error that can be introduced by the phase correction device.

While specific embodiments have been described in detail in the foregoing description and illustrated in the drawings, those with ordinary skill in the art may appreciate that various modifications to the details provided could be developed in light of the overall teachings of the disclosure. The particular arrangements disclosed are intended to be illustrative and not limiting as to the scope of the invention, which is to be given the full breath of the claims herein.

What is claimed is:

1. A system for correcting a light wavefront phase, the system comprising:
   a light wavefront having a phase and a path
   a holographic wavefront sensor in the path, providing two reconstruction beams for each of a plurality of detectors at two different detector locations, the reconstruction beams on each detector having a relative intensity;
   a phase correction device with a plurality of individual control connectors, each connected to a corresponding plurality of phase correction device pixels in the path;
   the plurality of detectors connected by the plurality of individual control connectors to the phase correction device, the control connectors controlling the phase correction device based upon the relative intensity to modify the phase correction device pixels and correct the light wavefront phase.

2. A holographic adaptive optic system comprising:
   a light wavefront having a phase and a path
   a phase correction device with a plurality of pixels in the path;
   a holographic wavefront sensor, the holographic wavefront sensor in the path, providing two reconstruction beams for each phase correction device pixel each beam with an intensity and a relative intensity between the two reconstruction beams,
      the beams illuminate a detector at two different detector locations;
   the detector connected by at least one individual control connector to the phase correction device, the plurality of individual control connector controlling the phase correction device based upon the relative intensities sensed at the detector.

3. The holographic adaptive optic system of claim 2 wherein the holographic wavefront sensor is multiplexed with a maximum and minimum phase response function at each individual control connector.

4. The holographic adaptive optic system of claim 2 wherein the two reconstruction beams are two spatially separate diffracted beams and the relative intensities indicating the weighting of the aberration between two aberration amplitude extremes.

5. The holographic adaptive optic system of claim 2 wherein the detector measures a weighted intensity of the two reconstruction beams to determine a wavefront aberration amplitude.

6. The holographic adaptive optic system of claim 5 wherein the wavefront aberration amplitude generates an electrical output from the detector through the control connector to the phase control device.

7. The holographic adaptive optic system of claim 6 wherein the control connector is wire, circuitry, fiber optics or a combination thereof.

8. The holographic adaptive optic system of claim 2 wherein the holographic wavefront sensor is a diffractive optical element.

9. The holographic adaptive optic system of claim 2 wherein the detector is a position sensing device, a charge-coupled device, a complementary metal-oxide-silicon detector, a diode, a photomultiplier or a combination thereof.

10. The holographic adaptive optic system of claim 2 wherein the phase correction device is a deformable mirror, micro-electromechanical mirror, liquid crystal display, or combination thereof.

11. The holographic adaptive optic system of claim 2 wherein the wavefront has at least one aberration and the control connector modifies the phase correction device pixels to decrease at least one aberration and correct the wavefront.

* * * * *